US011949225B2

(12) United States Patent
Sandler

(10) Patent No.: US 11,949,225 B2
(45) Date of Patent: Apr. 2, 2024

(54) SYSTEM FOR DETECTING AND COMPARING CURRENT IN A MOTOR

(71) Applicant: Buyers Products Company, Mentor, OH (US)

(72) Inventor: Philip Sandler, Mayfield Village, OH (US)

(73) Assignee: BUYERS PRODUCTS COMPANY, Mentor, OH (US)

( * ) Notice: Subject to any disclaimer, the term of this patent is extended or adjusted under 35 U.S.C. 154(b) by 48 days.

(21) Appl. No.: 17/736,336

(22) Filed: May 4, 2022

(65) Prior Publication Data

US 2023/0361553 A1    Nov. 9, 2023

(51) Int. Cl.
*H02H 7/08* (2006.01)
*H02H 1/00* (2006.01)

(52) U.S. Cl.
CPC ............ *H02H 7/08* (2013.01); *H02H 1/0007* (2013.01)

(58) Field of Classification Search
CPC ............ H02H 3/08; H02H 3/087; H02H 3/28; H02N 2/0005; H02N 2/026; H02N 2/103; H02N 2/106
See application file for complete search history.

(56) References Cited

U.S. PATENT DOCUMENTS

| 8,441,339 B2 | 5/2013 | Okada et al. |
| 9,057,752 B2 | 6/2015 | Luebke et al. |
| 10,295,439 B2 | 5/2019 | Manahan et al. |

(Continued)

FOREIGN PATENT DOCUMENTS

| DE | 102013101647 A1 * | 6/2014 | ......... B60R 25/1001 |
| JP | 2013210234 A * | 10/2013 | |

(Continued)

OTHER PUBLICATIONS

DownEaster Speed Controller SPE144 "Troubleshooting Guide for DownEaster Speed Controller SPE144". Retrieved from Internet: <http://downeastermfg.com/wp-content/uploads/2021/11/Troubleshooting-Guide-DownEaster-Speed-Controller.pdf> (Year: 2021).*

(Continued)

*Primary Examiner* — Jared Fureman
*Assistant Examiner* — Nicolas Bellido
(74) *Attorney, Agent, or Firm* — Emerson, Thomson & Bennett, LLC; Roger D. Emerson

(57) ABSTRACT

A control system that detects loosening of a vibrator component in a spreader system. As the vibrator loosens over time, it draws more current. Eventually, this excess current causes the vibrator motor to burn out. The control system detects the loosening of the vibrator to indicate a fault condition by measuring current increase in the vibrator, and then indicating a fault condition that the bolts must be tightened, which results in lowering of the current draw, thereby protecting the vibrator motor from burnout. The system has a "learning mode" capable of establishing and memorizing a baseline of current draw suitable for a vibrator. In this way, a current threshold is exceeded over time, which indicates loosening of the vibrator. The baseline level can be selectively changed adapted with changing conditions, or adapted to other types of systems besides spreader vibrators.

7 Claims, 3 Drawing Sheets

(56) References Cited

U.S. PATENT DOCUMENTS

| | | | | |
|---|---|---|---|---|
| 2014/0265983 A1* | 9/2014 | Eisenbeis | ............... | H02P 29/02 |
| | | | | 318/490 |
| 2014/0374515 A1* | 12/2014 | Truan | ................... | E01H 10/007 |
| | | | | 239/669 |
| 2016/0264387 A1 | 9/2016 | Yoon et al. | | |
| 2020/0269396 A1* | 8/2020 | Hu | ......................... | B25B 13/46 |
| 2020/0347869 A1 | 11/2020 | Sato et al. | | |

FOREIGN PATENT DOCUMENTS

| | | | |
|---|---|---|---|
| KR | 20110135041 A | * | 12/2011 |
| WO | WO2020116173 | | 6/2020 |
| WO | WO2020240765 | | 12/2020 |

OTHER PUBLICATIONS

Steven M. Kaplan, "C," in Wiley Electrical and Electronics Engineering Dictionary, IEEE, 2004, pp. 88-162. Retrieved from Internet:<https://ieeexplore.ieee.org/xpl/ebooks/bookPdfWithBanner.jsp?fileName=5273129.pdf&bkn=5273107&pdfType=chapter> (Year: 2004).*

* cited by examiner

SYSTEM FOR DETECTING AND COMPARING CURRENT IN A MOTOR

I. BACKGROUND

A. Technical Field

This invention generally pertains to the field of detection of loose and insecure components in a mechanical system. The invention specifically pertains to the field of detecting elevated current in a mechanical system that can be indicative of loose and insecure components.

B. Description of Related Art

As shown in the exploded view of FIG. 1, a spreader system 10 is mounted on the back of a vehicle (not shown) and typically includes a hopper 12 for receiving a quantity of material to be spread, such as salt or sand onto a road surface. The material flows down from the hopper 12 into a trough 14 which typically can include a motor driven auger or other such component for moving the material to a spinner disc for distribution. The trough 14 and related components are enclosed with a cover 16 that is secured to the hopper 12.

Salt and sand tend to stick to the sides of the hopper 12 so that no material falls into the trough 14 even though there is an adequate quantity in the hopper 12. To avoid such sticking, a vibration motor 20 is mounted to the side of the hopper 12. The vibration motor 20 shakes the sides of the hopper 12 thereby ensuring that material does not stick and hang up from entering the trough 14. As shown in FIG. 1, the vibration motor 20 is secured to the hopper 12 with a plurality of carriage bolts 22 which mount the vibration motor 20 with a vibrator retaining plate 24. A vibration motor 20 can also be mounted to the trough 14 of the spreader system 10, or any other suitable component or system.

A vibration motor 20 includes a mechanical motor and operates on a principle of rotating an offset counterweight. This offset rotation results in a certain amount of side-to-side internal momentum being applied to the body of the vibration motor 20. Over a period of time, the wobbling from this internal momentum may cause the carriage bolts 22 to loosen, which increases the magnitude of offset rotation within the vibration motor 20, resulting in additional current draw by the motor.

This additional current draw may eventually prematurely burn out the vibration motor 20, causing the vehicle operator to service a failed vibrator component and vehicle down time. The useful life of the vibration motor 20 is needlessly shortened, resulting in additional servicing and replacement expense on the part of the end user.

II. SUMMARY

Provided in this disclosure is a system including a vibrating electrical component configured for mounting onto a mounting surface. The system includes a vibrator motor configured for mounting onto a mounting surface. A current sensor measures a current level drawn from the vibrator motor to produce a sensor current level. A memory component is provided for storing a threshold current level value. A comparing component compares the sensor current level from the current sensor to the threshold current level value stored in the memory component. A correlating component correlates the sensor current level to the threshold current level value. An indicator component indicates when the threshold current level value is exceeded, thereby indicating an unacceptably high current level. A switch is provided for deactivating the vibration motor when the unacceptably high current level is indicated.

Additionally, a learning mode component establishes the threshold current level value stored in the memory component. The learning mode component includes a detector component that detects a measured current level from the vibration motor and an input component for entering an offset current level value indicative of an acceptably high additional current. The measured current level and the offset current level value are added together to define the threshold current level value and stored in the memory component. The offset current level can be in a range between 10% and 40% in excess of the measured current level. Preferably, the range of the offset current level is between 20% and 25% in excess of the measured current level.

In the preferred embodiment, the mounting surface is a hopper of a spreader system for retaining material to be distributed onto a road surface. In this implementations, the vibrator motor is configured to prevent the material from adhering to interior surfaces of the hopper. However, the present system can be adapted for detecting current overloads in a variety of applications, all without departing from the invention.

A control method is also provided in the present disclosure. A step is provided for measuring a current level drawn from an electrical component to produce a sensor current level. Another step includes storing a threshold current level value in a memory component. A further step is performed for comparing the sensor current level to the threshold current level value stored in the memory component. An additional step entails correlating the sensor current level to the threshold current level value. Yet another step is provided of indicating when the threshold current level value is exceeded, thereby indicating an unacceptably high current level. Another further step includes deactivating the electrical component when the unacceptably high current level is indicated.

Additionally, the present control method entails a learning mode for establishing the threshold current level value stored in the memory component. The learning mode includes methodology for detecting a measured current level from the electrical component, entering an offset current level value indicative of an acceptably high additional current, adding the measured current level and the offset current level value together to define the threshold current level value, and storing the threshold current level value in the memory component.

According to an aspect, the present invention detects excess current draw associated with loosening of a vibrator component from its mounting surface.

According to another aspect, the present invention avoids premature burnout and failure of a vibrator motor.

According to still another aspect, the present invention avoids unnecessary replacement of a vibrator component.

According to yet another aspect, the present invention avoids additional servicing and replacement expense on the part of the end user.

Other benefits and advantages of this invention will become apparent to those skilled in the art it pertains upon reading and understanding of the following detailed specification.

III. BRIEF DESCRIPTION OF THE DRAWINGS

The disclosed control system may take physical form in certain parts and arrangement of parts, embodiments of which will be described in detail in this specification and illustrated in the accompanying drawings which form a part hereof and wherein.

IV. DETAILED DESCRIPTION

Figure 1:
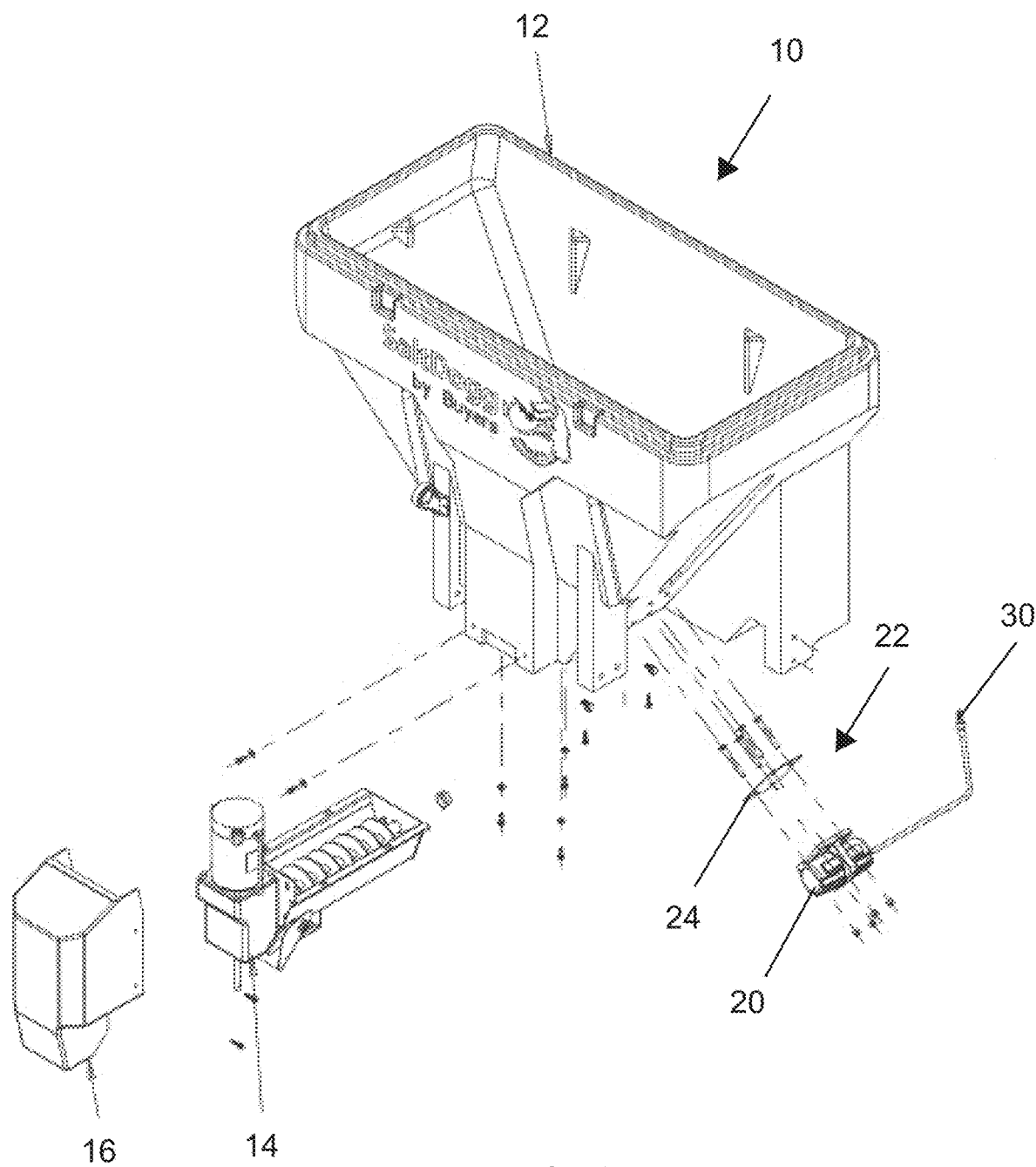
FIG. 1 is an exploded view showing a spreader system including a vibrator in accordance with an exemplary embodiment.

Reference is now made to the drawings wherein the showings are for purposes of illustrating embodiments of the article only and not for purposes of limiting the same, and wherein like reference numerals are understood to refer to like components.

Figure 2:
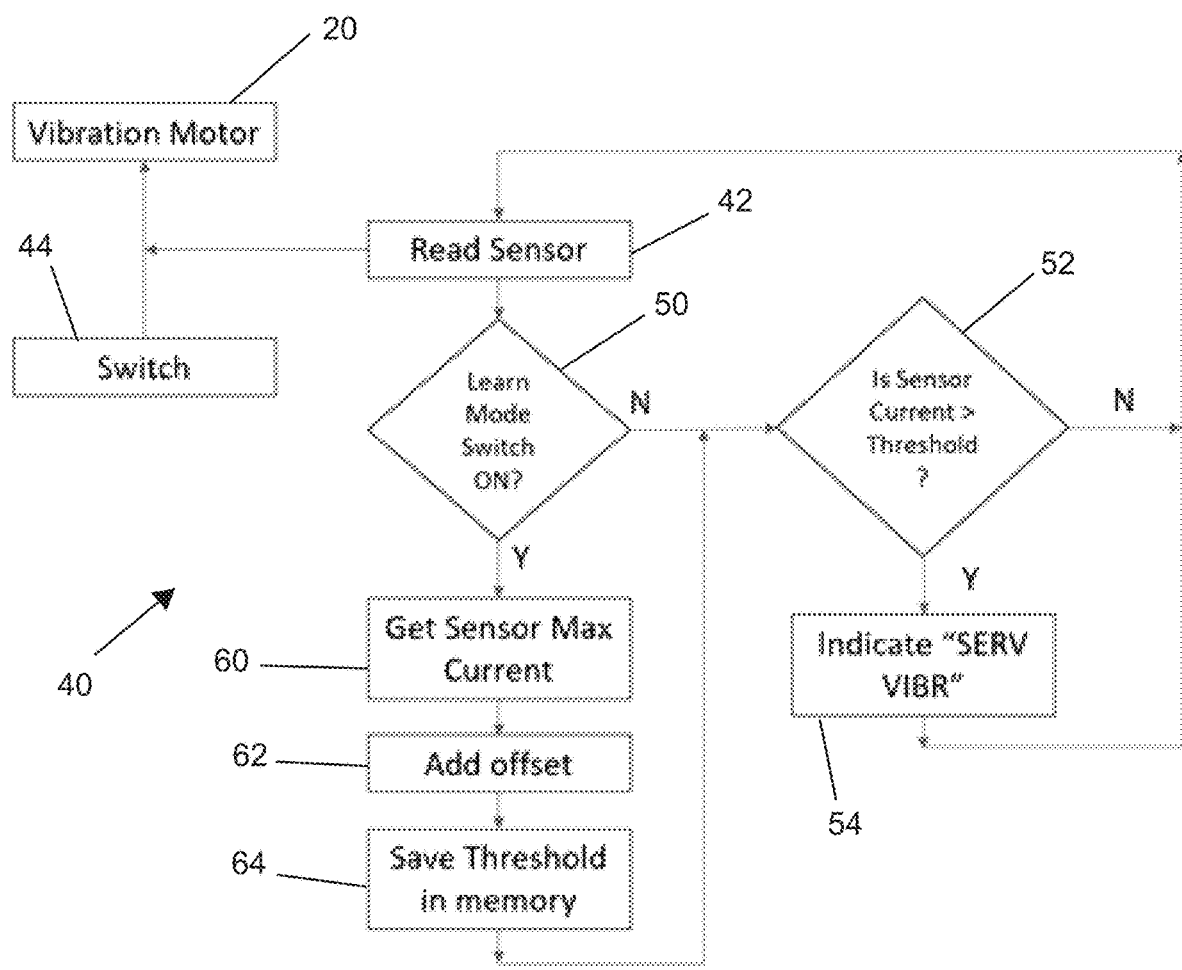
FIG. 2 is flow chart depicting the operation of the control system in accordance with an exemplary embodiment.
Figure 3:
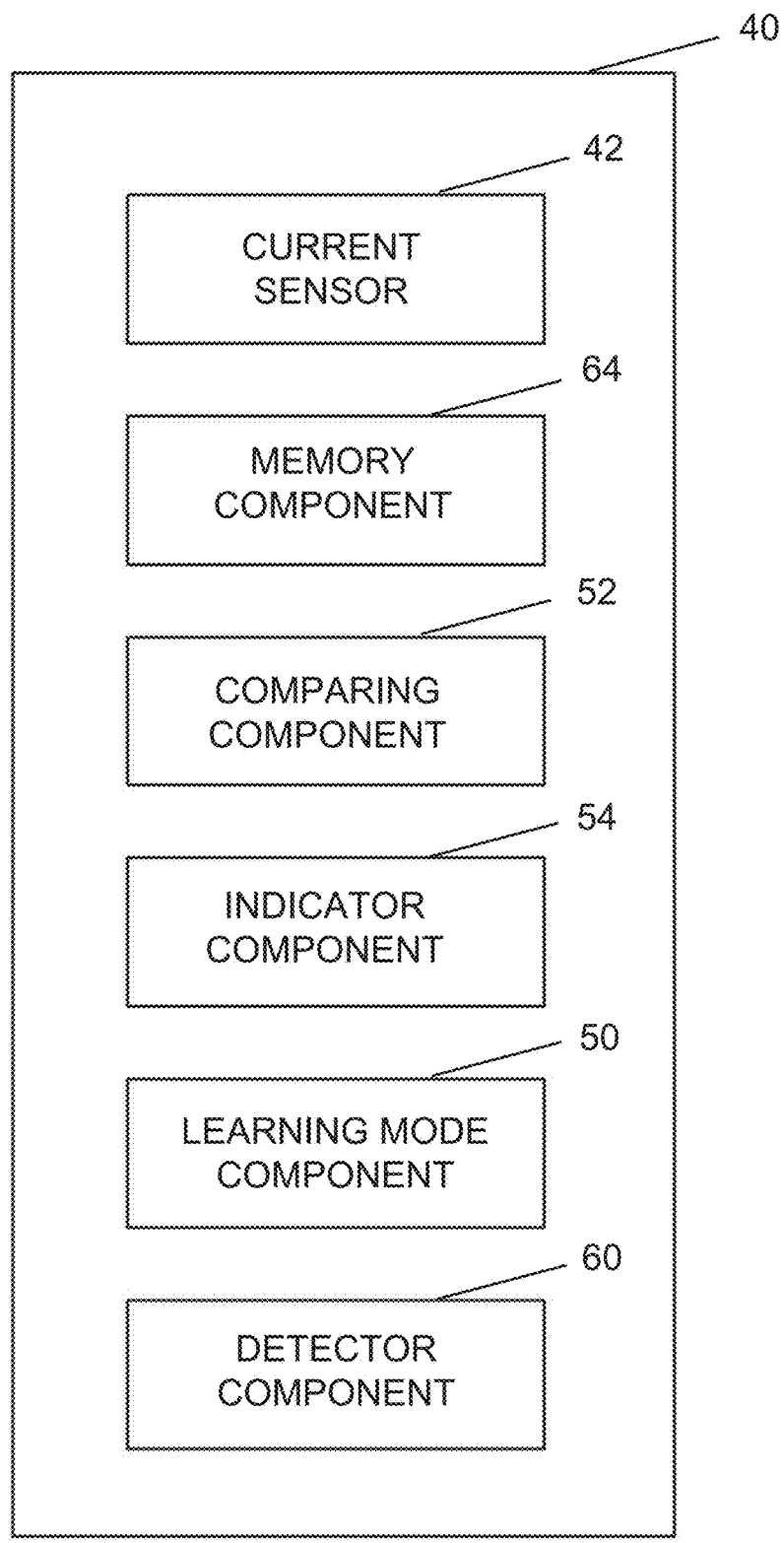
FIG. 3 is block diagram depicting the control system having components corresponding to the operations depicted in FIG. 2, in accordance with an exemplary embodiment.

As shown in FIGS. 1 and 2, the vibration motor 20 is configured for mounting onto a mounting surface, which is preferably a hopper 12 of a spreader system for retaining material such as salt or sand to be distributed onto a road surface. The vibration motor 20 is configured to be positioned at a selected location on the mounting surface to sufficiently agitate the hopper 12 to thereby prevent the material from adhering to the interior surfaces of the hopper 12. The vibration motor 20 is connected to a power/control line 30 for establishing an electrical connection for supplying electrical power to the vibration motor 20. The power/control line 30 interfaces with a control system 40, which is depicted in FIG. 2.

The flow chart of FIG. 2 depicts operational modes of the present control system 40, where it is to be appreciated that the indicated blocks in the flow chart correspond to discrete components of the control system 40 and also a control methodology implemented by the control system 40. A current sensor component is indicated as a "Read Sensor" block 42 in the flow chart. The current sensor is configured to measure the current level drawn from the vibration motor 20 to produce a sensor current level. At the "Read Sensor" block 42, the current sensor reads the current level from the vibration motor 20 and cooperates with the control system 40 to trigger a switch 44 to deactivate the vibration motor 20 if the current level is found to be unacceptably high. The "Read Sensor" block 42 can be configured so that the current sensor can measure the current level continuously or at specific intervals. The present control system includes a Learning Mode for establishing current threshold levels, as will be explained herewith.

With further continued reference to the flow chart of FIG. 2, a user can selectively activate the Learning Mode to establish a threshold current indicative of normal operating conditions. The Learning Mode is initially activated upon installation of the system when the vibration motor 20 is securely tightened to the hopper 12. The Learning Mode can be subsequently activated upon servicing when the vibration motor 20 is again tightened back down to the hopper 12, to establish a new threshold current value in the event that the initial level has changed, as described hereinbelow.

With ongoing reference to the flow chart of FIG. 2, a YES indication at the "Learning Mode Switch ON?" decision block 50 (corresponding to the learning mode component) indicates that the Learning Mode is activated. The control methodology proceeds from the "Read Sensor" block 42 to a "Get Sensor Max Current" block 60 where a detector component of the control system 40 detects the measured current level from the vibration motor 20 (either newly installed or recently maintained). From there, control methodology proceeds to an "Add Offset" block 62 in which an input component can enter an inputted value indicative of an acceptably high additional offset current level, over and above the measured current level, which can be safely drawn by the vibration motor 20 without risk of burnout. The measured current level and the offset current level are added together into a current threshold value and stored in the control system 40 at the "Save Threshold in Memory" block 64, which corresponds to the aforementioned memory component of the control system 40.

With further ongoing reference to FIG. 2, the "Save Threshold in Memory" block 64 proceeds to the "Is Sensor Current>Threshold" decision block 52 in which the sensor current from the "Read Sensor" block 42 is compared to the current threshold value stored in the memory component of the system 40. Thus, the step performed at the decision block 52 corresponds to the comparing component. The control methodology proceeds as described above to the "Indicate 'SERV VIBR'" block 54, corresponding to the indicator component, and follows the subsequent steps thereafter for determining a fault condition.

Further to the description of FIG. 2, the Learning Mode includes a reset function for reestablishing a different current threshold level value of the vibration motor 20 over the course of standard maintenance cycles. This different threshold current level can be retained in the memory component in the event that operating conditions of the overall system change over time. For example, as used with a spreader system, the properties of the plastic hopper are known to change over time (i.e., plastic "creep"). This can result in a change in the baseline current level of the vibration motor 20 required for normal operation. The Learning Mode of the present control system 40 can enable the learning component to "relearn" the new baseline current level as required.

As mentioned hereinabove, a fault condition is found to exist where the sensor current level exceeds the current threshold level by a predetermined offset amount corresponding to an unacceptable degree of looseness of the vibration motor 20 from the mounting surface of the hopper 12, which indicates a loosening of the carriage bolts 22 or enlarging of the mounting holes on the mounting surface. Depending on the conditions and the vibration motor 20, the predetermined offset amount of the sensor current level can be in a range between 10% and 40% in excess of the baseline current level. Depending on the specific circumstances, the range of the sensor current level can be between 20% and 25% in excess of the baseline current level. In this manner, when an excess current is measured in this range, the vibration motor 20 can be automatically shut off and/or an alert can be signaled to the operator by the control system 40 according to the flow logic described hereinabove.

As also mentioned hereinabove, a message indicator can be provided for indicating to an operator when the fault condition of the vibration motor 20 is measured. The message indicator can be a visual indicator such as a light on a user interface of the control system. The message indicator can include alphanumeric indicia to display a text-based alert message to the operator, such as "check vibrator mountings." Alternatively or in addition to the message indicator, the control system 40 can direct the switch 54 to deactivate the power/control line 30 for discontinuing electrical power to the vibration motor 20 upon detection of a fault condition.

It is to be appreciated that the present control system 40 is preferably a digital electronic system including software components for performing the indicated functions. However, the present control system 40 could be alternatively implemented as electronic hardware circuitry without departing from the invention. The present control system 40 is not limited to only spreader systems but can be adapted in an alternative embodiment to any electrical component that draws electrical power which might vary over time to any change in mechanical mounting, not only loosening.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

What is claimed:

1. A system, comprising:
   a vibrator motor configured for mounting onto a mounting surface;
   a current sensor for measuring a current level drawn from the vibrator motor to produce a sensor current level;
   a memory component for storing a threshold current level value;
   a comparing component for comparing the sensor current level from the current sensor to the threshold current level value stored in the memory component;
   an indicator component for indicating when the threshold current level value is exceeded, thereby indicating a high current level;
   a learning mode component for establishing the threshold current level value stored in the memory component, wherein the learning mode component comprises a detector component that detects a measured current level from the vibrator motor and an input component for entering an offset current level value indicative of a high additional current, wherein the measured current level and the offset current level value are added together to define the threshold current level value and stored in the memory component.

2. The system of claim 1, further comprising a switch for deactivating the vibration motor when the high current level is indicated.

3. The system of claim 1, wherein the offset current level is in a range between 10% and 40% in excess of the measured current level.

4. The system of claim 3, wherein the range of the offset current level is between 20% and 25% in excess of the measured current level.

5. The system of claim 1, wherein the mounting surface is a hopper of a spreader system for retaining material to be distributed onto a road surface, and wherein the vibrator motor is configured to prevent the material from adhering to interior surfaces of the hopper.

6. A control method, comprising:
   measuring a current level drawn from an electrical component to produce a sensor current level;
   storing a threshold current level value in a memory component;
   comparing the sensor current level to the threshold current level value stored in the memory component
   indicating when the threshold current level value is exceeded, thereby indicating e a high current level;
   a learning mode for establishing the threshold current level value stored in the memory component, wherein the learning mode comprises:
     detecting a measured current level from the electrical component;
     entering an offset current level value indicative of a high additional current;
     adding the measured current level and the offset current level value together to define the threshold current level value; and
     storing the threshold current level value in the memory component.

7. The control method of claim 6, further comprising deactivating the electrical component when the high current level is indicated.

* * * * *